A. B. Hurd.
Stove Pipe.
No. 63,797.     Patented Apr. 16, 1867.
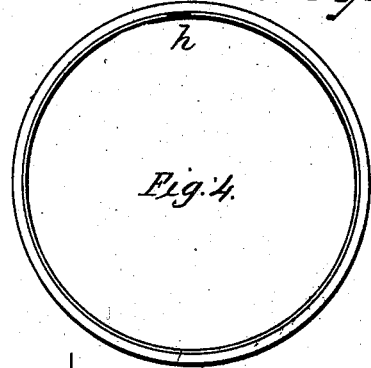
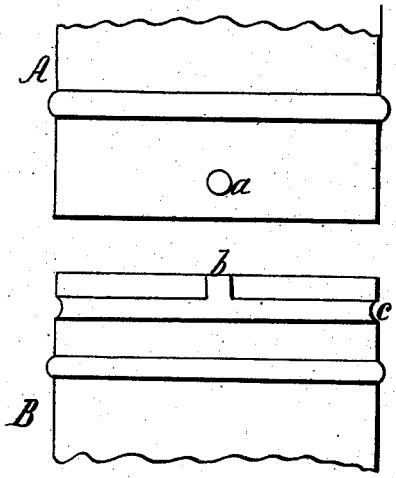
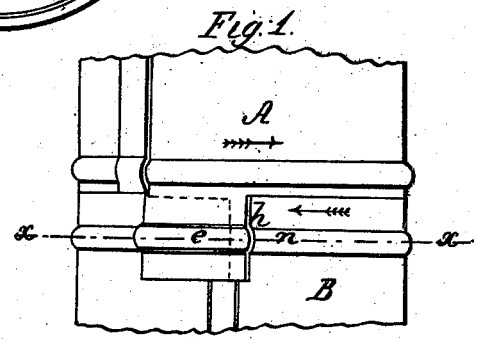
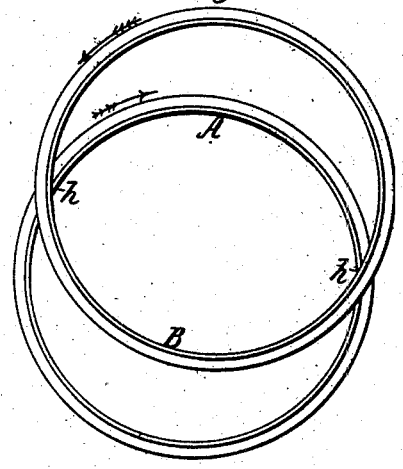
Witnesses:
P. F. Dodge
N. W. Hilliam
Inventor:
A. B. Hurd,
By W. E. Dodge
Attorney.

United States Patent Office.

A. B. HURD, OF WATKINS, NEW YORK.

Letters Patent No. 63,797, dated April 16, 1867.

---

METHODS OF UNITING STOVE PIPES, &c.

---

*The Schedule referred to in these Letters Patent and making part of the same.*

---

TO ALL WHOM IT MAY CONCERN:

Be it known that I, A. B. HURD, of Watkins, in the county of Schuyler, and State of New York, have invented certain new and improved Methods of Uniting Joints of Pipe; and I do hereby declare that the following is a clear, full, and exact description thereof, reference being had to the accompanying drawings, making part of this specification, and to the letters of reference marked thereon, like letters indicating like parts wherever they occur.

Figure 1 is a side view of two pieces partially locked together.

Figure 2 is an end view showing the parts in the act of being united.

Figure 3 is an end view of the same completely united.

Figure 4, an end view of a single piece.

Figure 5 represents a modification of the method of uniting the joints.

I take an ordinary piece of stove pipe or any similar tube that it is desired to unite, and form a bead near its end, as represented by $n$ and $e$, fig. 1; A and B representing the adjoining ends of two pieces of pipe that it is desired to unite. I then cut a narrow slit, $h$, in the end of each joint, as shown in figs. 4 and 1, and they are then ready to put together. To unite them they are placed together as represented in fig. 2, the end of each joint being inserted in the slit $h$ of its fellow. When thus inserted they are turned in opposite directions, by which operation the joint B is slid over the joint A, as represented in fig. 3, the bead $e$, on joint A, fitting into the corresponding bead $n$, on joint B, and thus locking the joints firmly together. To unlock them the edge $m'$, of joint B, is sprung in so as to engage under the edge $m$, of joint A, and turn them in a reverse direction, as indicated in fig. 3, until they are brought again to the position shown in fig. 2, when they can be readily separated. Fig. 5 represents a modification of this plan of uniting the joints. In this plan no slit is cut in the joints, but instead, I form a groove, $c$, around the inner joint, and then extend from this groove $c$ to the end of the pipe two or more grooves, $b$, at right angles to $c$, as shown, corresponding with the positions of these grooves $b$. I then form indentations $a$ in the opposite joint; these indentations producing projections on the inner side of the joint. The two joints are then shoved together endwise, the projection $a$ sliding in the groove $b$ until it comes opposite the groove $c$, when the two joints A and B are turned in opposite directions and thus locked together. It is obvious that the first plan locks the joints more securely, as the bead $e$ fits and holds in the bead $n$ all around; while in the latter case the projections $a$ only hold in the groove $c$.

Having thus described my invention, what I claim, is—

1. Uniting joints of stove pipe by means of the projections made by the indentations $a$ on one piece being shoved longitudinally in the groove $b$ of the opposite piece, and then turned into the circumferential groove $c$, as shown and described.

2. I claim uniting joints of pipe by means of the circumferential beads $e$ and $n$, and the narrow slits $h$, when arranged for joint operation as herein described.

A. B. HURD.

Witnesses:
GEO. C. SHEARER,
WM. HARDENBURG.